3,421,957
SEAM SEALER FOR PLASTIC MATERIALS
Raymond A. Kwapisz, Warren, Mich., assignor to General Motors Corporation, Detroit, Mich., a corporation of Delaware
Filed Sept. 8, 1965, Ser. No. 485,819
U.S. Cl. 156—153    5 Claims
Int. Cl. C09j 3/16

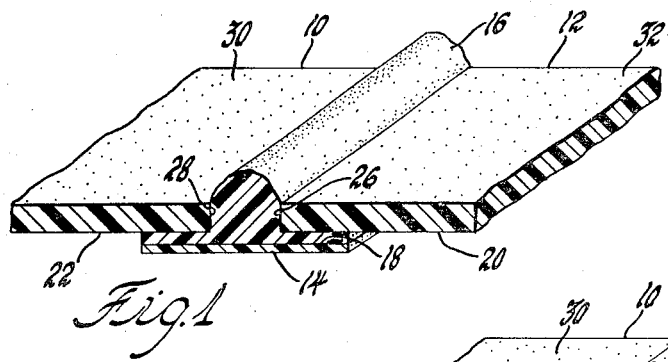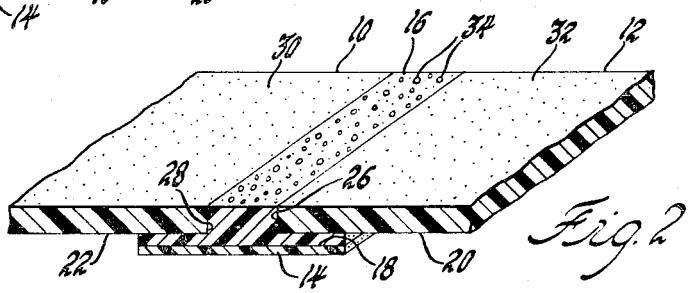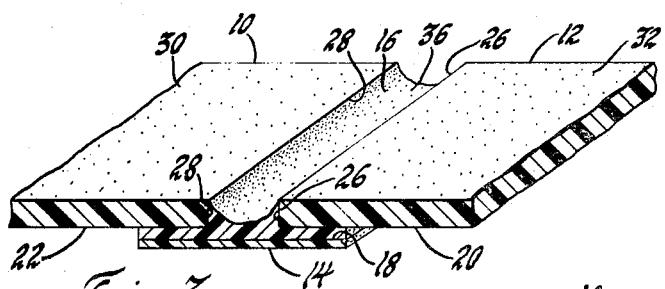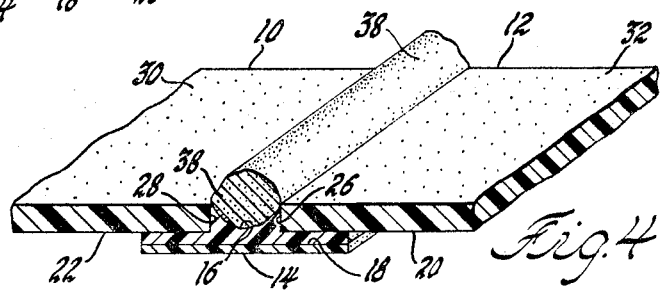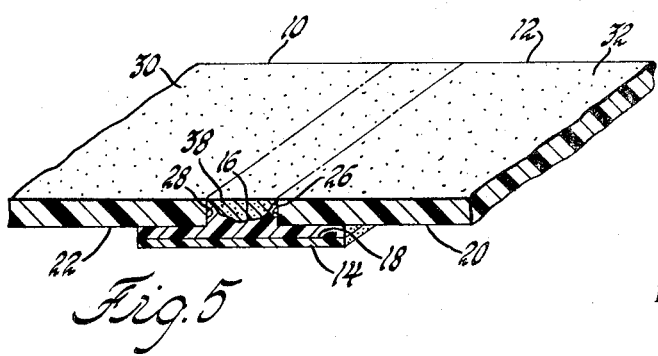

ABSTRACT OF THE DISCLOSURE

A seam sealer suitable for filling joints between plastic panels or parts containing glycidyl methacrylate, plasticizer, powdered filler, initiator and an accelerator is disclosed. The sealer mixture is prepared and shortly thereafter placed into the previously routed seam or joint separating two plastic panels. The mixture hardens in a short time to form a non-porous, air bubble-free seam at room temperature.

---

This invention relates to a seam sealer for filling joints between plastic panels or parts, and has particular utility in the manufacture of reinforced plastic vehicle bodies, boat hulls, furniture and the like.

The manufacture of plastic automobile bodies often requires the joining or bonding of various plastic fixtures, attachments, and the like, to a surface of a plastic panel. Such joints are presently formed by applying a layer of catalyzed, room temperature curing thermosetting polyester resin on a reinforcing plastic strip of the same material. This plastic strip is then placed so that it overlaps the two plastic panels being joined which have been positioned in a jig. Pressing the reinforcing strip against the two plastic panels forces the excess bonding resin up through the joint separating the two plastic panels. After the polyester resin has cured, the joint is ground and polished to remove all the projections. Pits or small holts on the surface of the polished polyester seam are a problem resulting primarily from air bubbles entrapped within the polyester resin which are uncovered during the subsequent grinding operation. The shrinkage of the polyester resin during the curing step also contributes to the pitting on the seam surface. The pits or holes on the polyester seam are eliminated by using a router tool to define or enlarge the hole, and filling these enlarged holes in the seam with additional polyester resin, and subsequently regrinding. This time consuming and costly procedure of removing the pits or holes from the seam is repeated until the surface is pit-free.

It is an object of this invention to provide an improved seam sealer for filling joints between plastic panels or parts. It is another object of this invention to provide a seam sealer for filling points between plastic panels or parts which is air bubble-free, nonporous, has low shrinkage, and is easily ground. It is still another object of this invention to provide a seam sealer for filling joints between plastic panels or parts which requires only one filling operation.

These and other objects are accomplished by the use of a seam sealer for filling joints between plastic panels or parts containing glycidyl methacrylate, plasticizer, powder filler, initiator and an accelerator. The plastic panels are joined in the conventional manner using a reinforcing backing strip and a bonding resin. After the bonding resin has cured sufficiently, the resin in the joint or seam near the exterior surface of the plastic panels is removed by means of a router tool or drill. The glycidyl methacrylate, plasticizer, filler, initiator and accelerator are mixed together and shortly thereafter placed into the previously routed seam or joint separating the two plastic panels. This mixture hardens in a short time to form a non-porous, air bubble-free seam having low shrinkage and which has grinding characteristics similar to that of the plastic panels.

Further objects and advantages of the present invention will be apparent from the following detailed description, reference being had to the drawings and the following examples wherein the preferred embodiments of the present invention are clearly shown.

In the drawings:

FIGURE 1 shows an end view of a joint between two plastic panels bonded with polyester resin;

FIGURE 2 shows an end view of a polyester resin filled joint after it has been ground and polished;

FIGURE 3 shows a polyester resin joint after the joint has been routed;

FIGURE 4 shows a polyester resin joint after it has been routed and filled with the improved seam sealer described in this invention; and FIGURE 5 shows the joint containing the seam sealer of this invention after it has been ground.

Referring now to the drawings, FIGURE 1 is an end view showing plastic panels 10 and 12 being joined together and reinforced by plastic strip 14 and bonding resin 16. The polyester bonding resin 16 is applied to the surface 18 of plastic strip 14 and pressed against sides 20 and 22 of the plastic panels 12 and 10 respectively. As the plastic strip 14 is pressed against plastic panels 10 and 12, the excess resin 16 fills the space in the joint between sides 26 and 28 of plastic panels 12 and 10 respectively with the excess of the resin 16 rising above the top surface 30 and 32 of panels 10 and 12. The excess polyester resin in the seam which protrudes above the top surfaces 30 and 32 is ground off so that the seam is level or flush with the surfaces 30 and 32 respectively. When this grinding and polishing has been completed, the seam has a number of pits 34, as shown in FIGURE 2, which are due primarily to entrapped air bubbles as well as the shrinkage of the polyester resin.

The seam sealer described in this invention is utilized in the following manner. The seam containing the polyester resin positioned between sides 28 and 26 is routed or drilled out by means of a routing tool to form a groove 36 in the seam between sides 26 and 28 and above the polyester resin 16 for receiving the seam sealer of this invention, as shown in FIGURE 3. The seam sealer 38 of this invention, as will hereinafter be more fully described, is mixed and placed in the space 36 between sides 26 and 28 above the polyester resin 16, as shown in FIGURE 4. The cured seam sealer 38 is then ground and polished to conform to the contour of the surfaces 30 and 32, as shown in FIGURE 5. The cured seam sealer 38 has no entrapped air bubbles therein, has very little shrinkage, and has grindability characteristics which are similar to the plastic panels or parts.

The composition of the seam sealer of this invention is a combination of glycidyl methacrylate, powder fillers, an initiator and an accelerator. A plasticizer may be used in the composition. The seam sealer composition of this invention is a combination of ingredients which produce an improved seam. The seam sealer resin used in the prior art and discussed previously contains a polyester binder, fibrous asbestos as the filler, styrene as the cross linking agent, an accelerator and an initiator. This prior art seam sealer contains unsaturated polyester groups which are cross linked by means of the styrene cross linking agent when the accelerator activates the polymerization initiator. The polyester-type resin sealer is a useful bonding material but has the disadvantage of entrapping air bubbles which are deleterious in the formation of a smooth, pit-free, seam surface.

The seam sealer of this invention contains an acrylic monomer binder, primarily glycidyl methacrylate by itself or in combination with other acrylic monomers, which is polymerized by the action of the initiator. The binder in the seam sealer of this invention is formed when a non-viscous liquid monomer is polymerized whereas the prior art polyester seam sealer binder is formed when a viscous polymer is cross linked. Since the prior art sealer contains a viscous polymer, it tends to entrap air bubbles therein whereas the seam sealer of this invention contains a non-viscous liquid monomer which does not entrap air as readily. Glycidyl methacrylate is an essential component of this seam sealer because this monomer has low volatility and forms a hard polymeric surface in a short time at room temperature. The seam sealer requires at least 10% by weight glycidyl methacrylate.

Other acrylic monomers having low volatilities may be used in conjunction with glycidyl methacrylate in order to decrease the monomer cost or to improve the properties of the seam sealer. For example, hydroxyethyl methacrylate is used with glycidyl methacrylate in order to make the seam sealer easier to sand and because it is less expensive. If the polymer is too hard, it is difficult to sand as fast as desired on a production line. A mixture containing 12% by weight glycidyl methacrylate and 5% by weight hydroxyethyl methacrylate was used in a preferred embodiment.

The prior art polyester resin seam sealer contained fibrous asbestos as its filler which is conducive to entrapping air bubbles therein. The seam sealer composition in a preferred embodiment of this invention contains a powder filler consisting of barium sulfate, aluminum powder, and talc. Barium sulfate is an inexpensive filler in powder form that does not have a tendency to trap air bubbles as does a fibrous filler. Polyester resin powder is another excellent inexpensive filler in powder form. Aluminum powder has been found to improve the sanding characteristics and to make the sanding property similar to that or the plastic panels or parts. Other metal powders such as copper, lead, etc. may be used to improve the sanding property. Talc is added to control the viscosity of the unpolymerized material. In addition to controlling the viscosity of the acrylic monomer, talc also helps to improve the sanding property. A concentration of between 10 and 89% by weight filler has been found to give a seam sealer having very desirable properties. The proportions of the various powders used in the fillers can be varied over a wide range and still obtain a seam having desirable properties.

Up to 5% by weight plasticizer may be added to the seam sealer composition to help the seam sealer withstand thermal shock. Any plasticizer which is compatible with acrylic monomers can be used. Examples of suitable plasticizers are butylbenzylphthalate, dioctylphthalate, isooctylbenzylphthalate, dibutylphthalate, dihexylphthalate and diisodecylphthalate. Isooctylbenzylphthalate is used in the preferred embodiments.

The initiators used in forming the seam sealer are the peroxides. The diaryl peroxides are preferred when using a tertiary aromatic amine accelerator. Benzoyl peroxide is used in the preferred embodiment. Any diaryl peroxide, such as 4,4'dichlorobenzoyl peroxide, 4,4'dibromobenzoyl peroxide, 4,4'dimethoxybenzoyl peroxide, 4,4'paramethylbenzoyl peroxide, 3,3',4,4'tetrachlorobenzoyl peroxide etc. may be used. The concentration of the peroxide ranges from 0.2 to 10% by weight.

Tertiary aromatic amines which are used as the accelerator with the diaryl peroxide in this invention are N-N-dimethyl-m-toluidine, N-N-dimethyl-p-toluidine, N-N-dimethylaniline, N-N-diethylaniline and so forth. The concentrations of the tertiary aromatic amine ranges from 0.2 to 10% by weight.

This sealer composition may be initiated by a hydro peroxide such as tertiary butyl hydro peroxide, cumene hydro peroxide, and so forth, when a metal chelate such as vanadyl acetylacetonate is used as the accelerator. The concentrations of the metal chelate and hydro peroxide are lower than the diaryl peroxide and amine system.

The seam sealer composition disclosed herein has the advantage of forming a seam which is pit-free, that is, it does not contain any entrapped air or holes therein, has a very low shrinkage, and its sanding characteristics are similar to that of the plastic panels used in automotive body panels. This seam sealer eliminates repeated seam filling steps which are costly and time consuming. Both the acrylic monomers and the fillers contribute towards forming an air bubble-free and pit-free seam which is easy to sand to the contours of the adjoining plastic panels.

The following examples show different embodiments of this invention which yield a hard, nonporous, air bubble-free seam.

EXAMPLE NO. 1

A mixture containing 12.5 milliliters of glycidyl methacrylate, 5 milliliters hydroxyethyl methacrylate, 1 milliliter isooctylbenzylphthalate, 35 grams of barium sulfate, 25 grams aluminum powder, 10 grams talc, and 0.3 gram benzoyl peroxide is mixed with a mixture containing 12.5 milliliters glycidyl methacrylate, 5 milliliters hydroxyethyl methacrylate, 1 milliliter isooctylbenzylphthalate, 35 grams barium sulfate, 25 grams aluminum powder, 10 grams talc, and 0.3 gram of N-N-dimethyl-p-toluidine to form a thick slurry. The thick slurry is then placed in the joint between the two plastic panels and allowed to set or cure for approximately five minutes to form a hard, nonporous, air-free seam. The excess seam sealer is removed by grinding. The seam is then polished to form a pit-free, smooth surface having a contour which matches the adjoining plastic panel surfaces.

EXAMPLE NO. 2

A mixture containing 12.5 milliliters glycidyl methacrylate, 5 milliliters hydroxyethyl methacrylate, 1 milliliter isooctylbenzylphthalate, 35 grams of barium sulfate, 25 grams aluminum powder, 8 grams of talc, and 0.5 gram benzoyl peroxide is mixed with a mixture containing 12.5 milliliters glycidyl methacrylate, 5 milliliters hydroxyethyl methacrylate, 1 milliliter isooctylbenzylphthalate, 40 grams barium sulfate, 25 grams aluminum powder, 8 grams talc, and 0.5 gram N-N-dimethyl-p-toluidine to form a thick slurry. The thick slurry is then placed in the joint between the two plastic panels and allowed to set or cure for approximately 5 minutes to form a hard, nonporous, air bubble-free seam. The excess seam sealer is removed by grinding. The seam is then polished to form a pit-free, smooth surface having a contour which matches the adjoining plastic panel surfaces.

EXAMPLE NO. 3

A mixture containing 10 milliliters glycidyl methacrylate, 20 grams polyester resin, 10 grams barium sulfate, 5 grams aluminum powder, and 3.0 grams benzoyl peroxide, is mixed with a mixture containing 5 milliliters glycidyl methacrylate, 10 grams polyester resin, 10 grams barium sulfate, 5 grams aluminum powder and 3 grams N-N-dimethylaniline to form a thick slurry. The thick slurry is applied to the seam and allowed to set or cure for five minutes to form a hard, non-porous, air bubble-free seam. The excess seam sealer is removed by grinding. The seam is then polished to form a pit-free, smooth surface having a contour which matches the adjoining plastic panel surfaces.

EXAMPLE NO. 4

A mixture containing 35 milliliters glycidyl methacrylate, 2 milliliters isooctylbenzylphthalate, 150 grams barium sulfate, 35 grams aluminum powder and 2 grams benzoyl peroxide is mixed with a mixture containing 35 milliliters glycidyl methacrylate, 2 milliliters isooctylbenzylphthalate, 150 grams barium sulfate, 35 grams aluminum powder and 2 grams N-N-dimethylaniline to form a thick slurry. The slurry is applied to the seam and allowed to set or cure for five minutes to form a hard, nonporous, air bubble-free seam. The excess seam sealer is removed by grinding. The seam is then polished to form a pit-free, smooth surface having a contour which matches the adjoining plastic panel surfaces.

While the invention has been described in terms of specific examples, it is to be understood that it is not limited thereby except as defined in the following claims.

I claim:
1. A sealer which forms an air bubble-free seam in joints between plastic parts consisting of between 10 and 89% by weight glycidyl methacrylate, between 10 and 89% by weight powder filler, 0 to 5% by weight plasticizer, 0.2 to 10% by weight peroxide and 0.2 to 10% by weight tertiary aromatic amine.

2. A sealer which forms an air bubble-free seam in joints between plastic parts comprising between 10 and 89% by weight of a mixture of glycidyl methacrylate and other acrylic monomers, between 10 and 89% by weight powder filler, 0 to 5% by weight plasticizer, 0.3 to 15% by weight peroxide, and 0.3 to 15% by weight tertiary aromatic amine.

3. A sealer which forms an air bubble-free seam in joints between plastic parts comprising between 10 and 15% by weight glycidyl methacrylate, 4 to 7% by weight hydroxyethyl methacrylate, 36 to 46% by weight barium sulfate, 24 to 34% by weight aluminum powder, 9 to 15% by weight talc, 0.2 to 0.6% by weight benzoyl peroxide, 0.2 to 0.6% by weight n-dimethyl-p-toluidine, and 0.9 to 1.5% by weight isooctylbenzylphthalate.

4. A sealer which forms an air bubble-free seam in joints between plastic parts comprising between 10 and 15% by weight glycidyl methacrylate, 4 to 7% by weight hydroxyethyl methacrylate, 36 to 46% by weight barium sulfate, 24 to 34% by weight aluminum powder, 9 to 15% by weight talc, 0.2 to 0.6% by weight benzoyl peroxide, 0.2 to 1.2% by weight N-N-dimethylaniline, and 0.9 to 1.5% by weight isooctylbenzylphthalate.

5. The method of forming an air bubble-free seam in joints between plastic parts comprising the steps of:
filling the space in the joint between the sides of the plastic parts that are to be joined with a polyester resin adhesive,
curing said polyester resin adhesive,
removing said adhesive in the joints joining the plastic parts which is near the exposed surface of the plastic part,
filling the joint with a seam sealer consisting of glycidyl methacrylate, a powder filler, accelerator and an initiator,
curing said seam sealer,
and removing any excess seam sealer.

References Cited
UNITED STATES PATENTS

| 2,745,817 | 5/1956 | Logemann | 260—885 |
| 2,868,760 | 1/1959 | Staicopoulos | 260—41 |
| 3,179,623 | 4/1965 | Bowen | 260—47 |
| 3,247,143 | 4/1966 | Hicks et al. | 260—23 |
| 3,309,423 | 3/1967 | D'Alelio | 260—885 |

EARL M. BERGERT, *Primary Examiner.*

MARTIN L. KATZ, *Assistant Examiner.*

U.S. Cl. X.R.

156—327; 260—86.1, 885

UNITED STATES PATENT OFFICE
CERTIFICATE OF CORRECTION

Patent No. 3,421,957                                                          January 14, 1969

Raymond A. Kwapisz

It is certified that error appears in the above identified patent and that said Letters Patent are hereby corrected as shown below:

Column 4, line 39, "35" should read -- 40 --.

Signed and sealed this 17th day of March 1970.

(SEAL)
Attest:

Edward M. Fletcher, Jr.                                WILLIAM E. SCHUYLER, JR.
Attesting Officer                                            Commissioner of Patents